United States Patent
Zink

(10) Patent No.: US 9,550,649 B2
(45) Date of Patent: Jan. 24, 2017

(54) APPARATUS FOR PROPELLING A COIL CLAD HOSE

(71) Applicant: STONEAGE, INC., Durango, CO (US)

(72) Inventor: Gerald P. Zink, Durango, CO (US)

(73) Assignee: STONEAGE, INC., Durango, CO (US)

(*) Notice: Subject to any disclaimer, the term of this patent is extended or adjusted under 35 U.S.C. 154(b) by 46 days.

(21) Appl. No.: 14/671,402

(22) Filed: Mar. 27, 2015

(65) Prior Publication Data

US 2015/0202666 A1    Jul. 23, 2015

Related U.S. Application Data

(63) Continuation of application No. PCT/US2014/039326, filed on May 23, 2014, which is (Continued)

(51) Int. Cl.
*B65H 51/10*    (2006.01)
*B65H 51/32*    (2006.01)
(Continued)

(52) U.S. Cl.
CPC ............ *B65H 51/10* (2013.01); *B65H 51/32* (2013.01); *B65H 79/00* (2013.01); *B08B 9/0433* (2013.01); (Continued)

(58) Field of Classification Search
CPC ............ B65H 2404/1141; B65H 2404/13161; B65H 2404/1416; B65H 51/02; B65H 51/04; B65H 51/10; B65H 51/32; B65H 79/00; B65H 2701/33
See application file for complete search history.

(56) References Cited

U.S. PATENT DOCUMENTS 438,356 A    10/1890   McEnany
1,249,038 A    12/1917   Dabney
(Continued)

FOREIGN PATENT DOCUMENTS

JP    2007-268421 A    10/2007
KR    10-2012-0139405    12/2012

OTHER PUBLICATIONS

International Search Report and Written Opinion, dated Sep. 24, 2014, from corresponding International Application No. PCT/US2014/039326.

(Continued)

*Primary Examiner* — Michael McCullough
(74) *Attorney, Agent, or Firm* — Greenberg Traurig, LLP

(57) ABSTRACT

An apparatus for propelling a plurality of coil clad hoses simultaneously includes a plurality of modules. Each module includes a primary driven bull gear. A follower bull gear is rotatably fastened to a follower axle extending parallel to the drive axle and the follower bull gear meshes with the primary bull gear. A plurality of secondary bull gear/sprocket modules are fastened to each of the axles, each of the modules having a secondary bull gear having teeth extending to a first outer diameter and a sprocket gear having teeth extending a distance less than the first outer diameter. The secondary bull gear teeth of modules on the drive axle mesh with corresponding secondary bull gear teeth of modules on the follower axle to define between adjacent modules an opening width for receiving and passing therebetween a coil clad portion of a high pressure hose.

20 Claims, 8 Drawing Sheets

Related U.S. Application Data a continuation-in-part of application No. 13/905,969, filed on May 30, 2013, now abandoned.

(60) Provisional application No. 61/975,156, filed on Apr. 4, 2014.

(51) Int. Cl.
  *B65H 79/00* (2006.01)
  *B08B 9/043* (2006.01)
  *F16L 3/18* (2006.01)
  *B65H 75/44* (2006.01)

(52) U.S. Cl.
  CPC ... *B65H 75/4481* (2013.01); *B65H 2404/1416* (2013.01); *B65H 2701/33* (2013.01); *F16L 3/18* (2013.01); *Y10T 74/188* (2015.01); *Y10T 74/18096* (2015.01)

(56) References Cited

U.S. PATENT DOCUMENTS

| | | | |
|---|---|---|---|
| 2,166,448 | A | 7/1939 | Schuknecht et al. |
| 2,346,728 | A | 4/1944 | Carlson |
| 2,540,203 | A | 2/1951 | Hatcher, Sr. |
| 2,769,191 | A | 11/1956 | Hunt et al. |
| 2,807,502 | A | 9/1957 | Tharp |
| 2,894,536 | A | 7/1959 | Arnot |
| 2,960,851 | A | 11/1960 | Ciaccio |
| 3,025,547 | A | 3/1962 | Ciaccio |
| 3,119,536 | A | 1/1964 | Berkeley |
| 3,224,024 | A | 12/1965 | Hunt |
| 3,329,044 | A | 7/1967 | Singer |
| 3,370,599 | A | 2/1968 | Ciaccio |
| 3,673,029 | A | 6/1972 | McLarty |
| 3,734,369 | A | 5/1973 | Johnson |
| 3,882,565 | A | 5/1975 | Irwin et al. |
| 4,153,966 | A | 5/1979 | Irwin |
| 4,312,679 | A | 1/1982 | Klein, Sr. |
| 4,349,284 | A | 9/1982 | Andersson |
| 4,354,626 | A | 10/1982 | Brandewie et al. |
| 4,395,791 | A | 8/1983 | Irwin |
| 4,406,142 | A * | 9/1983 | Kelstrom ............... B21D 15/06 72/77 |
| 4,420,852 | A | 12/1983 | Bowlsby |
| 4,440,038 | A | 4/1984 | Potter |
| 4,580,306 | A | 4/1986 | Irwin |
| 4,589,447 | A | 5/1986 | Kane et al. |
| 4,602,808 | A | 7/1986 | Herron et al. |
| 4,686,732 | A | 8/1987 | Irwin |
| 4,947,698 | A | 8/1990 | Dodds et al. |
| 5,193,242 | A | 3/1993 | Irwin |
| 5,482,089 | A | 1/1996 | Weber et al. |
| 5,500,974 | A | 3/1996 | Wu |
| 5,762,108 | A | 6/1998 | Hunter |
| 5,901,401 | A | 5/1999 | Rutkowski et al. |
| 5,933,903 | A | 8/1999 | Irwin |
| 5,988,226 | A | 11/1999 | Matthews |
| 6,076,219 | A | 6/2000 | Irwin |
| 6,081,050 | A | 6/2000 | Hong et al. |
| 6,193,282 | B1 | 2/2001 | Assenheimer |
| 6,360,397 | B1 | 3/2002 | Babb |
| 6,390,141 | B1 | 5/2002 | Fisher et al. |
| 6,412,136 | B1 | 7/2002 | Rutkowski |
| 6,604,758 | B1 | 8/2003 | Assenheimer |
| 6,655,228 | B1 | 12/2003 | Margherio et al. |
| 7,478,451 | B2 | 1/2009 | Rutkowski et al. |
| 8,161,786 | B2 | 4/2012 | Stapleton |
| 2006/0117888 | A1 | 6/2006 | Tsubono et al. |
| 2009/0133771 | A1 | 5/2009 | He |
| 2011/0220700 | A1 | 9/2011 | Zink |
| 2012/0227815 | A1 | 9/2012 | Zink |
| 2014/0159273 | A1 * | 6/2014 | Koop .................... B65H 51/10 264/129 |

OTHER PUBLICATIONS

Supplemental European Search Report, dated Nov. 18, 2016, from corresponding European Patent Application No. 14804119.7.

* cited by examiner

APPARATUS FOR PROPELLING A COIL CLAD HOSE

CROSS REFERENCE TO RELATED APPLICATIONS

This application is a continuation of International Patent Application No. PCT/US2014/039326, filed May 23, 2014, which is a continuation in part of U.S. patent application Ser. No. 13/905,969, filed May 30, 2013, and claims the benefit of priority of U.S. Provisional Patent Application No. 61/975,156, filed Apr. 4, 2014. Each of these applications is incorporated herein by reference in its entirety.

BACKGROUND OF THE DISCLOSURE

The present disclosure is directed to manipulation of flexible conduit, tubing and hoses. In particular, embodiments of the present disclosure are directed to an apparatus for extension and retraction of flexible conduit such as a helical coil clad high pressure hose and an apparatus for precise extension and retraction of a plurality of flexible conduits such as helical coil clad high pressure hoses used as flexible nozzle lances.

During water blast cleaning operations in fluid conduits such as a piping system, heat exchanger tubing, or sewer systems, high pressure hoses are often difficult to manipulate over distances. Various power driven mechanisms have been developed to address such difficulties. One such mechanism is disclosed in my U.S. patent application Ser. No. 12/723,410, filed Mar. 12, 2010, now U.S. Pat. No. 8,887,343.

SUMMARY OF THE DISCLOSURE

The present disclosure directly addresses such needs. An apparatus in accordance with an exemplary embodiment of the present disclosure for propelling a coil clad hose includes a first driven pair of bull gears sandwiching a rotatable drive sprocket rotatably fixed to a first axle in a frame. The frame may be an open or closed protective housing. In an embodiment in which the coil clad hose passes through a passage through the frame or housing, this first axle is oriented orthogonal to and spaced from the passage through the housing. A second pair of bull gears sandwiching a second drive sprocket is rotatably fastened to a second axle parallel to the first axle in the housing. The second pair of bull gears mesh with the first pair of spaced bull gears. Both axles are aligned orthogonal to and spaced on opposite sides, and equidistant from, the passage through the housing. Teeth on the drive sprockets engage part of the coil clad fluid hose when the fluid hose is inserted into the passage. A slip clutch between the pairs of spaced bull gears and the drive sprocket on each of the axles adjusts frictional grip on the coil when one of the bull gears is driven to propel the hose through the passage. This clutch primarily limits the force transmitted through the sprocket teeth to the coil of the coil clad hose like a rack (the coil clad hose) and pinion (the sprocket) arrangement. This arrangement can also protect the coil clad hose from buckling in case of encountering an obstacle or obstruction. This arrangement also allows the two sprockets to share the load transmitted to the hose equally and thus also to be synchronized.

In one aspect, a coil clad hose feed/propelling apparatus in accordance with one embodiment of the present disclosure includes a hollow housing having a pinion drive gear rotatably supported in the housing and the housing may include a through passage for receiving and passing a coil clad portion of a tubular body therethrough. Mounted in the housing is a first pair of spaced bull gears fixed to a first axle rotatably supported in a first portion of the hollow housing and oriented orthogonal to the through passage. One of the first pair of bull gears is engaged with the pinion drive gear. Also mounted in the housing is a second pair of spaced bull gears rotatably fastened to a second axle parallel to and spaced from the first axle. This second pair of spaced bull gears meshes with the first pair of spaced bull gears. A first drive sprocket is rotatably supported on the first axle and sandwiched between the first pair of bull gears. The first axle is spaced from the passage through the housing such that the first drive sprocket can engage part of the coil clad portion of the tubular body inserted into the passage. A second drive sprocket is rotatably supported on the second axle and sandwiched between the second pair of bull gears, and the second axle is spaced from the passage through the housing such that the second drive sprocket can engage another part of the coil clad portion of the tubular body inserted into the passage. A slip clutch is provided between the pairs of spaced bull gears and the drive sprockets on each of the axles.

Preferably the housing includes a first part supporting the first axle and a second part supporting the second axle, wherein the first and second parts of the housing together define the through passage for receiving the tubular body therethrough. The slip clutch has a first pair of slip clutch discs on the first axle sandwiching the first sprocket therebetween and a second pair of slip clutch discs on the second axle sandwiching the second sprocket therebetween. Alternatively slip clutch discs may be omitted in some applications and the gear and sprocket faces utilized directly as the slip clutch. The slip clutch may include one or more wave springs between the first drive sprocket and the first bull gear. The slip clutch may include wave springs on each of the first and second axles between the first and second drive sprockets and the first and second bull gears.

The first and second drive sprockets are spaced apart by a distance corresponding to the coil clad portion of a tubular body inserted into the passage so that teeth on the sprockets engage diametrically opposite portions of the coil clad portion of the tubular body.

Another embodiment in accordance with another aspect of the present disclosure is an apparatus that includes a hollow housing having two separable parts defining a through passage between the parts of the housing for receiving therethrough a coil clad portion of a fluid hose. A first pair of spaced bull gears is rotatably fixed to a first axle rotatably supported orthogonally to and spaced from the through passage in a first part of the hollow housing. Preferably one of the first pair of bull gears is engaged with a pinion drive gear. A second pair of spaced bull gears is rotatably fastened to a second axle in the second part of the housing parallel to and spaced from the first axle and orthogonal to and spaced from the through passage. This second pair of spaced bull gears is positioned to mesh with the first pair of spaced bull gears when the separable parts of the housing are joined.

A first drive sprocket is rotatably supported on the first axle and sandwiched between the first pair of bull gears. The first axle is spaced from the passage through the housing such that the first drive sprocket can engage part of the coil clad portion of the fluid hose inserted into the passage. A second drive sprocket is rotatably supported on the second axle and sandwiched between the second pair of bull gears. The second axle is spaced from the passage through the housing such that the second drive sprocket can engage another part of the coil clad portion of the fluid hose inserted into the passage.

A drive mechanism for use with the present apparatus may include a liquid or pneumatic fluid motor or an electric motor. Such a motor preferably includes a pinion gear extending into the housing that engages one of the two first bull gears. In one embodiment the drive mechanism is supported by the housing and the pinion gear is rotatably supported in the first part of the housing.

This embodiment of the apparatus also has at least one slip clutch between the pairs of spaced bull gears and the drive sprockets on each of the axles. Preferably the first pair of bull gears is keyed to the first axle so that they rotate with the axle. The first drive sprocket is not keyed to the first axle. It is free to rotate on the first axle. Preferably the slip clutch comprises a first pair of slip clutch discs on the first axle sandwiching the first sprocket therebetween. A second pair of slip clutch discs may be provided on the second axle sandwiching the second sprocket therebetween. In one embodiment the slip clutch may include one or more wave spring between the first drive sprocket and the first bull gear. The slip clutch may also include wave springs on each of the first and second axles between the first and second drive sprockets and the first and second bull gears.

In accordance with the present disclosure an embodiment of an apparatus for propelling a hose includes a hollow housing having a through passage for receiving a coil clad portion of a fluid hose. The apparatus includes a first pair of spaced bull gears rotatably fixed to a first axle rotatably supported orthogonal to and spaced from the through passage in a first part of the hollow housing. A second pair of spaced bull gears is rotatably fastened to a second axle in a second part of the housing parallel to and spaced from the first axle and spaced from the through passage, wherein the second pair of spaced bull gears is positioned to mesh with the first pair of spaced bull gears. A first drive sprocket is rotatably supported on the first axle and sandwiched between the pair of rotatably fixed bull gears. The first axle is spaced from the passage through the housing such that the first drive sprocket can engage part of the coil clad portion of the fluid hose when the fluid hose is inserted into the passage. A second drive sprocket is rotatably supported on the second axle and sandwiched between the second pair of bull gears, wherein the second axle is spaced from the passage through the housing such that the second drive sprocket can engage another part of the coil clad portion of the fluid hose inserted into the passage. The apparatus also includes a slip clutch between the pairs of spaced bull gears and the drive sprockets on each of the axles.

An exemplary apparatus in accordance with the present disclosure for propelling a plurality of coil clad hose assemblies includes a set of gear/sprocket modules, each configured to drive a single coil clad high pressure hose. In one embodiment, the gear/sprocket modules are assembled onto a common drive axle which in turn meshes with identical follower gear/sprocket modules such that each module pair (drive and follower) can operably sandwich a single coil clad high pressure hose. Each module pair can drive the single coil clad high pressure hose synchronously with adjacent coil clad high pressure hoses in a common direction for insertion into and retraction out of parallel tubes to be cleaned.

As an example, utilizing a modular coil clad hose driving assembly in accordance with the present disclosure that has three interconnected module pairs, an operator can clean a heat exchanger tube sheet comprising an array of 36 parallel tubes in about a third of the time needed to position, insert and clean each of the tubes separately.

An exemplary modular assembly for accurately positioning and handling a plurality of coil clad hoses simultaneously includes a primary driven bull gear fixed to a drive shaft, a plurality of driven gear/sprocket modules fastened to the drive shaft, a primary follower bull gear rotatably mounted on a follower axle extending parallel to the drive shaft, wherein the primary follower bull gear meshes with the primary driven bull gear, and a second plurality of follower gear/sprocket modules fastened to the follower axle, each follower gear/sprocket module configured to mesh with a corresponding one of the driven gear/sprocket modules so as accommodate and sandwich one of the coil clad hoses therebetween.

An apparatus for feeding and retracting coil clad portions of a plurality of high pressure hose assemblies in accordance with an embodiment includes a primary bull gear fastened to a driven drive axle and a follower bull gear rotatably fastened to a follower axle extending parallel to the drive axle. The follower bull gear meshes fully with the primary bull gear. A plurality of secondary bull gear/sprocket modules are fastened to each of the axles.

Each of the modules includes a secondary bull gear having teeth extending to a first outer diameter and a sprocket gear having teeth extending a distance less than the first outer diameter. The secondary bullgear teeth of modules on the drive axle mesh with corresponding secondary bull gear teeth of modules on the follower axle so as to define between adjacent meshed modules an opening width for receiving and passing therebetween a coil clad portion of a high pressure hose assembly. The sprocket gear teeth of corresponding meshed secondary bull gear/sprocket modules are spaced apart so as to engage the coil clad portion of the high pressure hose.

In one embodiment, the apparatus includes a drive mechanism coupled to a hollow housing having two separable parts defining a plurality of parallel through passages between the parts of the housing each for receiving therethrough a coil clad portion of a fluid hose. A primary bull gear in the housing is fastened to a drive axle connected to the drive mechanism. A follower bull gear is rotatably fastened to a follower axle extending parallel to the drive axle. This follower bull gear meshes with the primary bull gear. A plurality of secondary bull gear/sprocket modules in the housing are fastened to each of the axles. Each of the modules includes a secondary bull gear having teeth extending to a first outer diameter and a sprocket gear having teeth extending a distance less than the first outer diameter. The secondary bull gear teeth of modules on the drive axle mesh with corresponding secondary bull gear teeth of modules on the follower axle to define between adjacent modules an opening width for receiving and passing therebetween a coil clad portion of a high pressure hose assembly aligned with the passages through the housing. The sprocket gear teeth of corresponding secondary bull gear/sprocket modules are spaced apart so as to engage the coil clad portion of the high pressure hose assembly.

The apparatus according to this disclosure has several advantages. For example, mechanical sprocket engagement with the coils on the coil clad hose allows the hose to be pushed through the article to be cleaned without buckling. Kinking is avoided, friction is reduced, and longer distances may be achieved in tortuous passage. The use of the steel coil clad hose protects the hose cover from wear as it travels through the article to be cleaned and protects it as it encounters abrasive debris, sharp edges, and the like. This also provides positive positioning to enhance safety, productivity and uniformity of the cleaning operation.

Further features, advantages and characteristics of the embodiments of this disclosure will be apparent from reading the following detailed description when taken in conjunction with the drawing figures.

DETAILED DESCRIPTION

Figure 1:
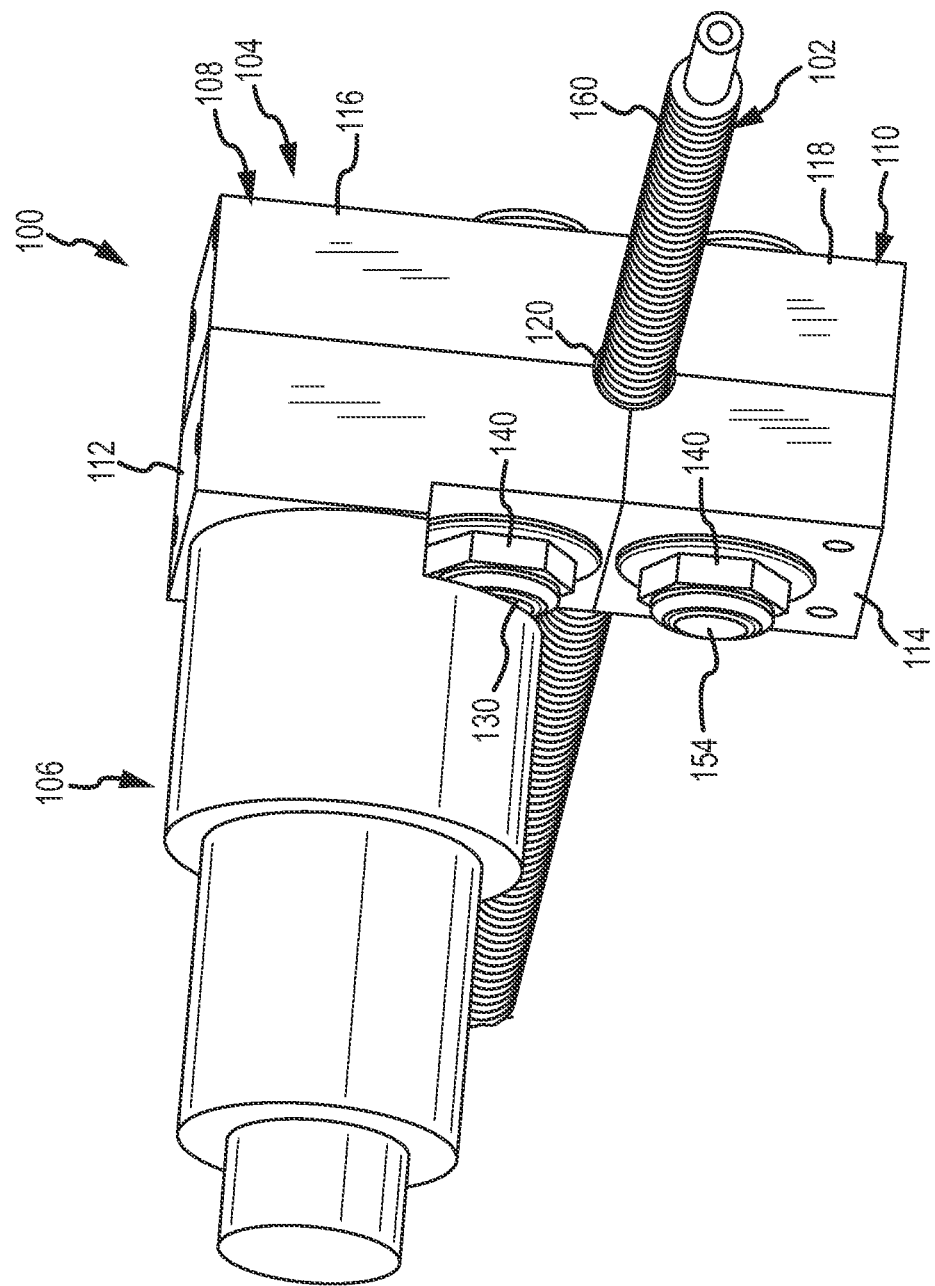
FIG. 1 is an external perspective view of one exemplary embodiment of an assembled drive apparatus for linearly moving a coil clad hose in accordance with the present disclosure.

A perspective view of one exemplary embodiment of an apparatus 100 for propelling a coil clad hose 102 is shown in FIG. 1. The apparatus 100 includes a hollow two piece housing 104 to which is attached a fluid drive motor 106. In this embodiment, the housing 104 is in four pieces. Housing 104 has an upper hollow box section 108 and a lower hollow box section 110 which are vertically bolted together with threaded bolts (not shown).

Each of upper and lower box sections 108 and 110 has a left half box segment 112 and 114 and a right half box segment 116 and 118 which are bolted together by horizontal housing bolts (not shown for clarity). When assembled, the housing 104 forms a rectangular box around a central passage 120 passing through the inside four corners of the box segments 112, 114, 116, and 118.

Figure 2:
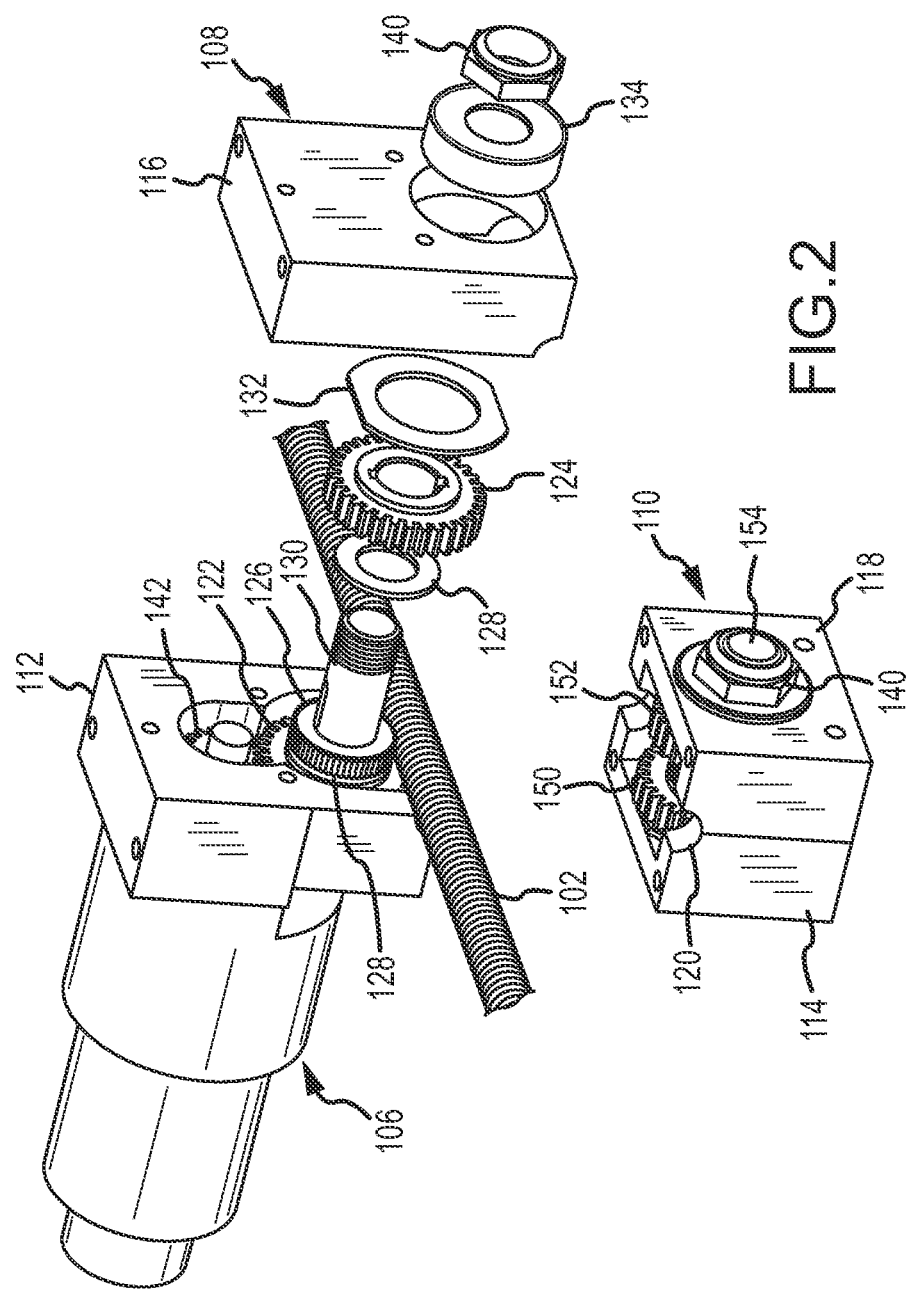
FIG. 2 is a separate exploded perspective view of the apparatus shown in FIG. 1.

An exploded view of the apparatus 100 showing the operable internal parts of the apparatus 100 is shown in FIG. 2. An assembled perspective view of the operable internal parts of the apparatus 100 with the housing 104 removed is shown in perspective in FIG. 3.

Turning now to FIG. 2, the internal parts of the upper housing section 108 are shown in an exploded fashion. A first pair of bull gears 122 and 124 is keyed onto a first axle 130 for rotation with axle 130. These two bull gears 122 and 124 may move axially on the axle 130, but are rotatably fixed such that they rotate with the axle 130. Between these two bull gears 122 and 124 is a rotatable upper sprocket 126. Between the sprocket 126 and each of the bull gears 122 and 124 is a slip clutch disc 128. Thus the upper sprocket 126 is sandwiched between the bull gears 122 and 124 and each slip clutch disc 128 is sandwiched by the upper sprocket 126 and one of the bull gears 122 or 124. The sprocket 126 is free to rotate on the axle 130. On the other side of each of the bull gears 122 and 124 is a thrust washer 132 and a bearing 134 press/friction fit into each of the housing segment 112 or 116 that supports the axle 130 in the upper housing section 108.

The axle 130 may have a bolt head on one end or both ends may be threaded. As is shown in FIG. 1, both ends of axle 130 are threaded. Thus mounted on the axle 130, from one end to the other, is first an adjustment nut 140, a bearing 134, a thrust washer 132, a first bull gear 122, a slip clutch 128, a drive sprocket 126, a slip clutch 128, another first bull gear 124, a thrust washer 132, another bearing 134, and an adjustment nut 140.

Each of the slip clutches 128 may be a single or double friction disc set or may comprise a set of one or more wave springs depending on the friction required to transmit torque from the bull gears 122 and 124 to the freely rotatable drive sprocket 126 so that it rotates with the bull gears 122 and 124. This torque is adjusted by tightening or loosening the adjustment nuts 140 on the threaded ends of the axle 130 which squeeze the components together to increase the frictional force on the sprocket 126.

Each of the bull gears 122 and 124 has spur gear teeth that can mesh with a driven pinion gear 142 that is fastened to an end of a driven shaft from the drive motor 106. In the embodiments illustrated, the pinion gear 142 is housed within section 112 of the housing 104. It is to be understood that this pinion gear 142 could be mounted to any one of the sections 112, 114, 116 or 118.

Figure 3:
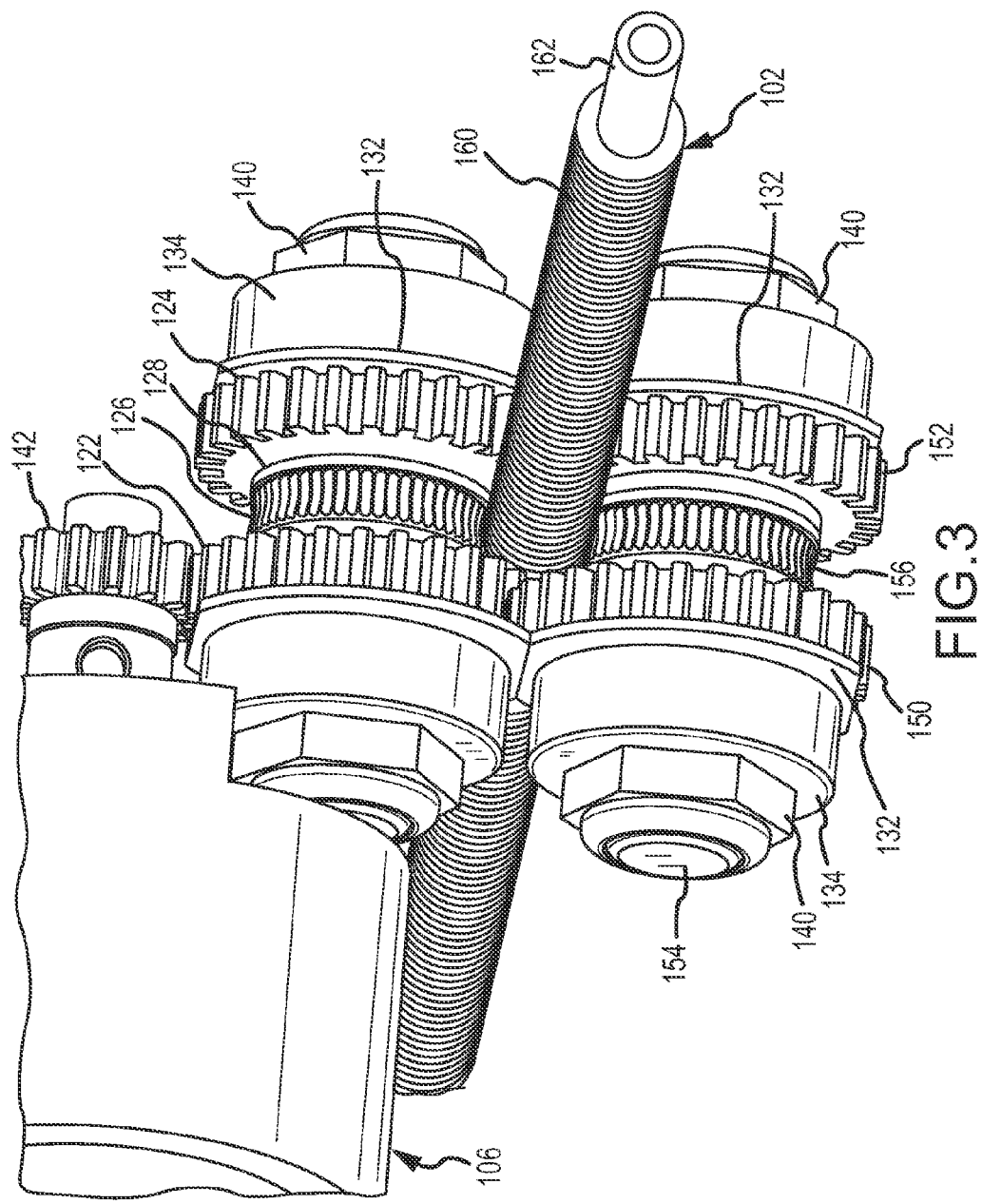
FIG. 3 is a perspective view of the internals of the apparatus shown in FIG. 1 with the housing removed.

A second set of bull gears 150 and 152 are rotatably mounted on another axle 154 in the lower housing section 110 in a similar manner except that bull gears 150 and 152 need not be rotatably fixed to the axle 154 as in the upper section 108 above described. The assembly on the lower axle 154 is best seen in FIG. 3. The assembly includes a second pair of bull gears 150 and 152 rotatably mounted on axle 154 and sandwiching a second drive sprocket 156 that is also rotatably mounted on axle 154. A set of 2 slip clutches 128 sandwich the second drive sprocket 156. Again, each of the slip clutches 128 may be made up of one or more friction discs or wave springs to provide sufficient frictional torque such that the drive sprocket rotates together with the bull gears 150 and 152 but if the torque required to drive the coil clad hose is great, the sprockets 128 and 156 can slip so as not to damage the coil clad hose being propelled through the passage 120. Again, the friction applied by the slip clutches 128 is adjusted by tightening or loosening the nuts 140 as necessary to achieve proper applied force to the coil clad hose.

Figure 4:
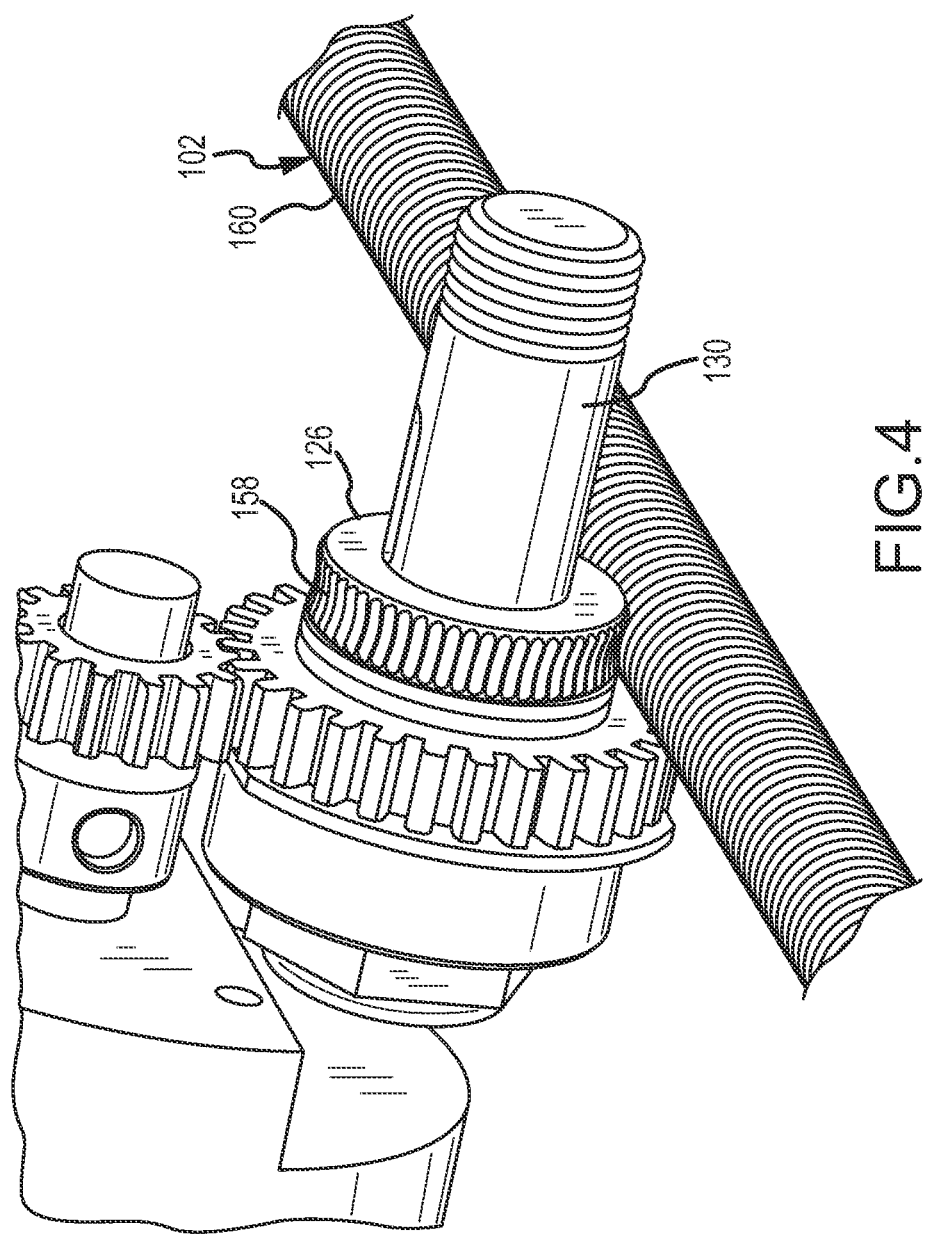
FIG. 4 is a partial perspective view of the upper driven portion of the apparatus shown in FIG. 3.

Since the coil clad hose 102 has a helical coil wrapped around the hose, the teeth 158 on each of the drive sprockets 126 and 156 are canted and hollow curved at an angle complementary to the pitch of the coil 160 wrapped around the hose 162 as is shown in FIG. 4. The curvature and cant of the teeth/grooves in the sprockets 156 and 126 match the helix of the wire coil 160. The distance between the sprockets 126 and 156 is determined by the location and spacing between the axles 130 and 154. In an embodiment having separable upper and lower housing sections 108 and 110, dimensional variations in the coil clad hose may be accommodated by spacing the sections 108 and 110 apart appropriately. Alternatively different sized housings may be provided with different passage to axle spacings provided for each different size coil clad hose.

Figure 5:
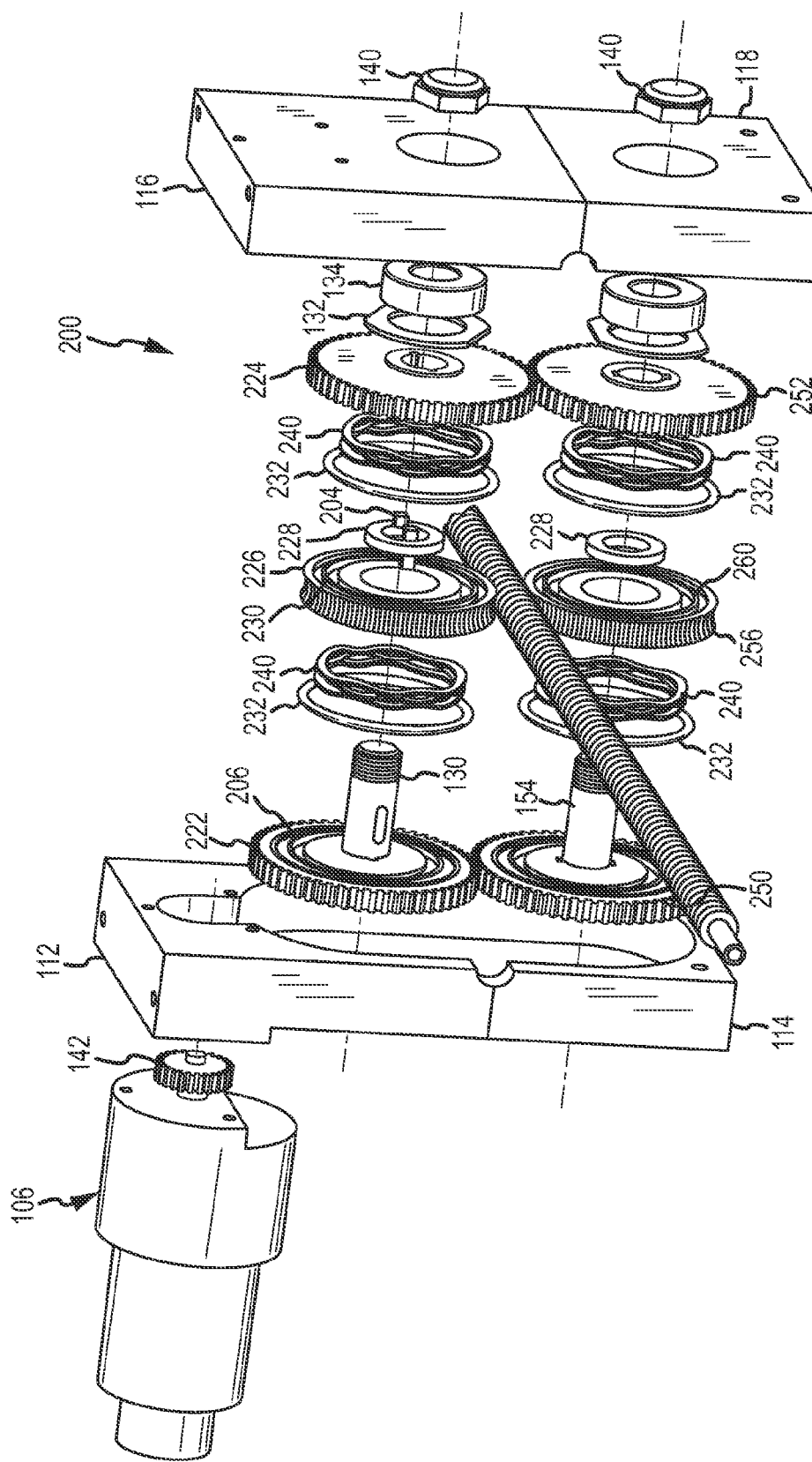
FIG. 5 is a perspective exploded view of an alternative embodiment of an apparatus in accordance with the present disclosure.

Another embodiment of an apparatus 200 is shown in the exploded view of FIG. 5. This embodiment 200 is identical to that shown in FIGS. 1-4 except for the structure of the slip clutches between the bull gears and drive sprockets. In this embodiment 200, the drive sprocket 226 is rotatably mounted on a bushing 228 which is, in turn, rotatably mounted on the upper shaft 130. The drive sprocket 226 has a circumferential groove 230 on both opposite faces of the drive sprocket 226 each for receiving an O-ring 232 therein. Each bull gear 222 and 224 rotatably fixed on the axle 130 via keys 204 has a complementary circumferential groove 206 in its inside face for receiving the O-ring 232 adjacent the drive sprocket 226. A set of wave springs 240 is sandwiched between the bull gear 222 and the sprocket 226 and bounded by the O-ring 232. Another set of wave springs 240 is sandwiched between the bull gear 224 and the sprocket 226 and bounded by the other O-ring 232. Grease is contained within the cavity formed by the sprocket 226, bushing 228, the O-rings 232 and the bull gear 222. Similarly, grease is contained within the wave spring space between the sprocket 226, bushing 228, O-ring 232 and bull gear 224.

The lower set of bull gears 250 and 252 sandwiching sprocket 256 on shaft 154 are similarly configured except that the bull gears 250 and 252 are not rotatably fixed on the axle 154. As above, the sprocket 256 is mounted on a bushing 228 and has a circumferential groove 260 on both opposite faces of the drive sprocket 256 each for receiving an O-ring 232 therein. Each bull gear 250 and 252 is rotatably mounted on the axle 154 and each has a complementary circumferential groove 206 in its inside face for receiving the O-ring 232 adjacent the drive sprocket 226. A set of wave springs 240 is sandwiched between the bull gear 250 and the sprocket 256 and bounded by the O-ring 232. Another set of wave springs 240 is sandwiched between the bull gear 252 and the sprocket 256 and bounded by the other O-ring 232. Grease is contained within the cavity formed by the sprocket 226, bushing 228, the O-rings 232 and the bull gear 250. Similarly, grease is contained within the wave spring space between the sprocket 226, bushing 228, O-ring 232 and the bull gears 252.

It is to be understood that various changes can be made to the apparatuses 100 and 200 in accordance with the present disclosure. The coil clad hose may have a helical coil pitch different than that shown in the Figures. For example, the coil clad hose may have a spaced apart pitch similar to that shown in my prior application Ser. No. 12/723,410.

For example, the housing 104 may be hinged between sections 108 and 110 so as to provide a clamshell type enclosure around a coil clad hose to be propelled. The coil clad hose may have a different spacing between the helical coil wraps than as illustrated in the figures. Thus any helix structure around a hose, cable or other conduit may be gripped by an appropriately configured drive sprocket set 126 and 156 in an alternative embodiment of the apparatus in accordance with the present disclosure.

Figure 6:
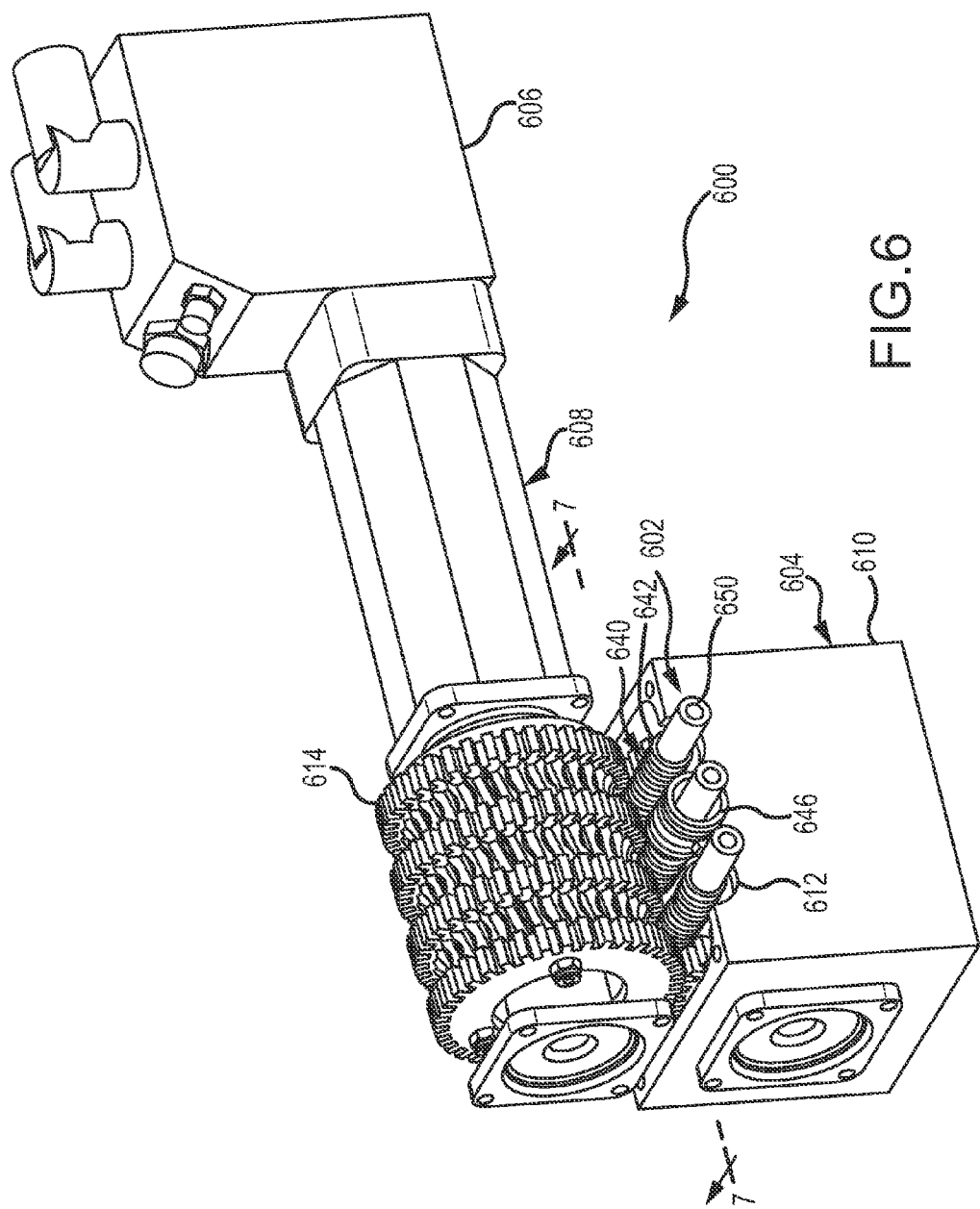
FIG. 6 is an external perspective view of one exemplary embodiment of an assembled drive apparatus for linearly moving a plurality of coil clad hose assemblies in accordance with the present disclosure.

A perspective view of an exemplary embodiment of an apparatus 600 for propelling a plurality of coil clad hose assemblies 602 (3) is shown in FIG. 6. Each of the hose assemblies 602 preferably terminates in a rotary nozzle to form a flexible lance designed to be repetitively inserted into an article to be cleaned, such as one of an array of parallel tubes in a heat exchanger bundle.

The apparatus 600 includes a hollow two piece housing 604 to which is attached a fluid drive motor 608 and position encoder/rotary transducer/rotary transmitter 606. The position encoder 606 provides precise position indication for the set of hoses 602 being manipulated. The position information allows an operator, or an automatic controller, to safely and efficiently cover the intended range of cleaning motion, or stroke, without over-travel. Over-travel at either end of the cleaning stroke is a hazard to personnel, causes damage to the lance, and wastes time and water.

In this exemplary embodiment, the housing 604 is in two rectangular box sections. Housing 604 has an upper hollow box section (not shown) and a lower hollow box section 610 which are vertically bolted together with threaded bolts (also not shown). When assembled, the housing 604 forms a rectangular box around a set of three central passages 612 passing through the housing 604.

The apparatus 600 includes a primary bull gear 614 fastened to a driven drive axle 616 supported by ball bearing 618 in the upper hollow box section of the housing 604. A follower bull gear 620 is rotatably fastened to a follower axle 622 extending parallel to the drive axle 616 in the lower box section 610. This follower bull gear 620 meshes with the primary bull gear 614.

Figure 7:
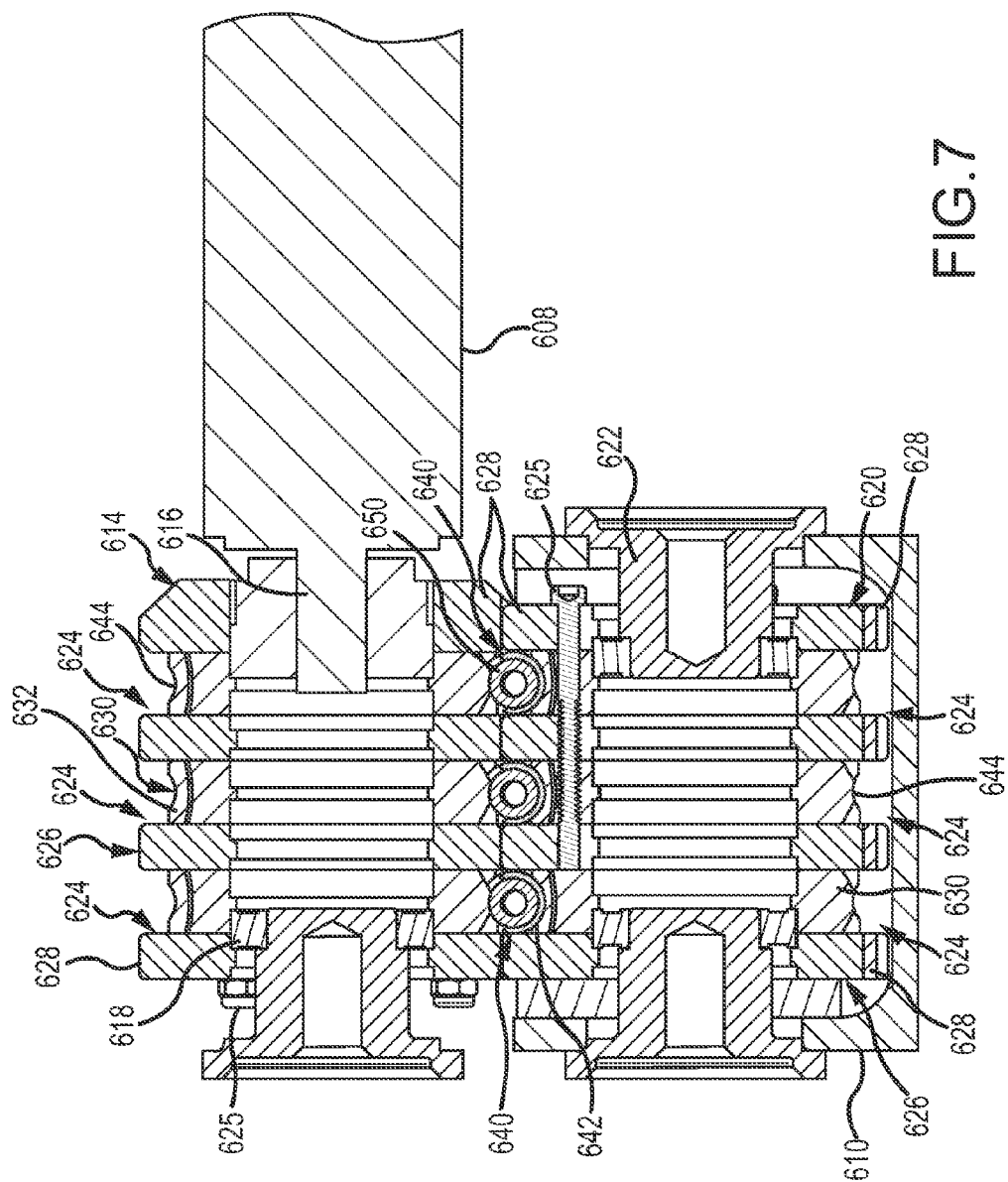
FIG. 7 is a vertical sectional view of the apparatus shown in FIG. 6 taken along line 7-7 showing the internals of the apparatus with the housing removed.
Figure 8:
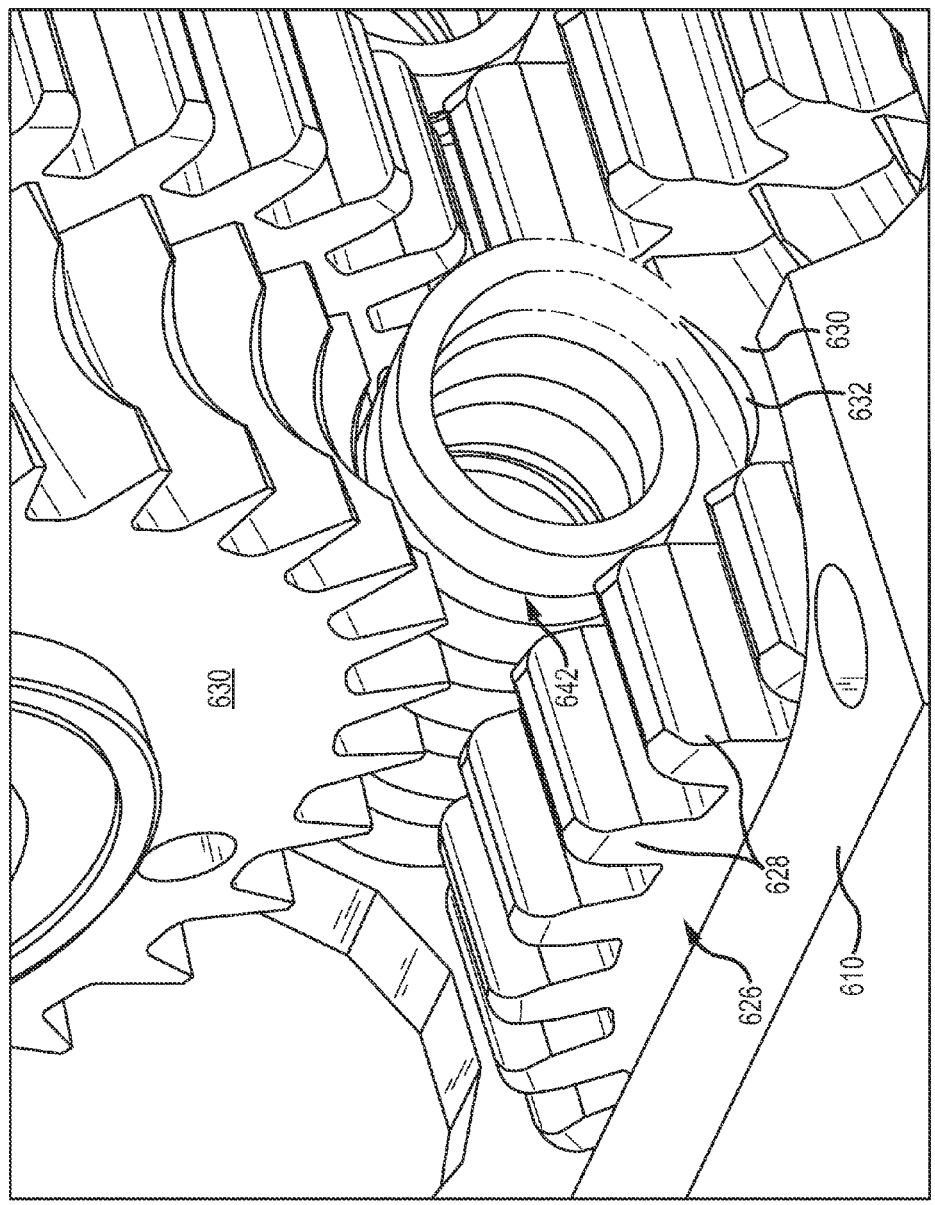
FIG. 8 is an enlarged partial perspective view of the upper driven portion of the apparatus shown in FIG. 6.

A plurality of secondary bull gear/sprocket modules 624 are fastened to each of the primary bull gears 614 and 620. In this illustrated embodiment 600 shown in FIGS. 6-8, there are three modules 624 fastened to the primary bull gear 614 on the driven axle 616 via bolts 625 and three modules 624 fastened to the follower bull gear 620. Each of the modules 624 has a secondary bull gear 626 having teeth 628 extending to a first outer diameter and a sprocket gear 630 having teeth 632 extending a distance less than the first outer diameter. The secondary bull gear teeth 628 of modules 624 fastened on the drive axle 616 via bolts 625 to the primary bull gear 614 fully mesh with corresponding secondary bull gear teeth 628 of modules 624 fastened to the follower axle 622 via follower bull gear 620 via bolts 625. These meshing teeth 628 define between adjacent modules 624 an opening width for receiving and passing therebetween a coil clad portion 640 of a high pressure hose assembly 602.

The sprocket gear teeth 632 on each sprocket gear 630 of corresponding secondary bull gear/sprocket modules 624 are spaced apart so as to each engage one of the coil turns 642 of the coil clad portion 640 of the high pressure hose assembly 602. Each tooth 632 on each sprocket gear has a central recessed portion 644 (See FIG. 7) to accommodate passage of the high pressure hose without engaging the surface of the high pressure hose. In operation, the aligned pairs of facing teeth 632 engage each of the turns 642 of the coil clad portion 640. The outer portions of each tooth 632 adjacent each of the recessed portions 644 engage and apply the thrust to the coil clad portion 640 of the hose assembly 602 while permitting the hose to pass with a slight clearance to accommodate presence of some debris on the hose and minimize abrasion of the hose surface.

The housing 604 includes openings 612 aligned with the sprocket gears 630 to facilitate passage of the coil clad high pressure hose assembly 602 therethrough. Preferably a sleeve 646, one of which is shown in FIG. 6, within the opening 612 guides passage of the hose assembly 602 through the side walls of the housing 604. An extended guide/conduit/sheath attached to each sleeve then conducts the advancing lance to the article being cleaned, and the retracting lance to a storage reel. This guide/conduit/sheath protects the operator from high pressure jets and contact with the traveling flexible lance.

The primary bull gear 614 is preferably keyed to the drive axle 616. The driven modules 624 are preferably bolted to the primary bull gear 614. They may be alternatively keyed to the driven axle 616 in alternative embodiments. The secondary bull gear/sprocket modules 624 on the follower axle 622 are bolted to the primary bull gear 620 as is shown.

The coil clad hose assembly 602 preferably includes a high pressure hose 650 and coil 640 of turns 642 of flat spring music wire wrapped around the body of the hose such that each turn of the coil 140 compressively engages the outer surface of the hose. This compressive engagement ensures that no slippage of the coil 640 along the hose length takes place. This condition is necessary so that the indexer 608 can accurately correlate axle and gear rotation with hose position.

It is to be understood that various changes can be made to the apparatus 600 in accordance with the present disclosure. The coil clad hose assembly 602 may have a helical coil pitch different than that shown in the Figures. For example, the coil clad hose may have a spaced apart pitch similar to that shown in my prior application Ser. No. 12/723,410.

The housing 604 may be hinged between sections 608 and 610 so as to provide a clamshell type enclosure around a set of coil clad hose assemblies to be propelled. Each of the coil clad hoses may have a different spacing between the helical coil wraps than as illustrated in the figures. Thus any helix structure around a hose, cable or other conduit may be gripped by an appropriately configured module 624 in an alternative embodiment of the apparatus in accordance with the present disclosure. The drive motor 606 may be hydraulic, pneumatic or electrical.

In the embodiment illustrated, there are three pairs or sets of modules 624 for manipulation of three hose assemblies 602. This embodiment 600 is merely exemplary. Any number of sets of modules 624 may be stacked together and fastened to the bull gears 614 and 620 on the axles 616 and 622. As presently envisioned, a practical limitation of about 10 modules 624 are envisioned to be attached to a drive 606 so as to handle up to 10 hose assemblies 602 at the same time.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. An apparatus for feeding and retracting coil clad portions of one or more high pressure hose assemblies, the apparatus comprising:
    a primary bull gear fastened to a driven drive axle
    a secondary bull gear rotatably fastened to a follower axle extending parallel to the drive axle such that the secondary bull gear meshes with the primary bull gear; and
    one or more bull gear/sprocket modules fastened to each of the driven drive axle and the follower axle;
    each of the bull gear/sprocket modules having a bull gear with bull gear teeth extending to a first outer diameter and a sprocket gear having sprocket gear teeth extending a distance less than the first outer diameter, wherein the bull gear teeth of each one of the modules on the drive axle mesh with corresponding bull gear teeth of a corresponding one of the modules on the follower axle, and wherein the sprocket gear teeth of corresponding bull gear/sprocket modules are spaced apart so as to engage opposite portions of a helical coil of the coil clad portion of the high pressure hose therebetween wherein each tooth on each sprocket gear has a central recessed portion to accommodate passage of the high pressure hose and outer portions extending radially beyond the central recessed portion for engaging the coil of the coil clad portion of the high pressure hose.

2. The apparatus according to claim 1 wherein the central recessed portion has a curved shape complementary to the high pressure hose.

3. The apparatus according to claim 1 further comprising a housing containing the bull gear/sprocket modules.

4. The apparatus according to claim 3 wherein the housing includes openings aligned with the sprocket gears to facilitate passage of the coil clad high pressure hose therethrough.

5. The apparatus according to claim 1 wherein the primary bull gear is keyed to the drive axle.

6. The apparatus according to claim 1 wherein only the primary bull gear is fixed to the drive axle and the one or more bull gear/sprocket modules on the drive axle are bolted to the primary bull gear.

7. The apparatus according to claim 1 wherein three bull gear/sprocket modules are fastened to the primary bull gear and three bull gear/sprocket modules are fastened to the follower bull gear.

8. The apparatus according to claim 1 wherein the recessed portion has a curved shape.

9. The apparatus according to claim 8 further comprising a housing containing the primary bull gear, the follower axle and the plurality of bull gear/sprocket modules.

10. The apparatus according to claim 9 wherein the housing includes openings aligned with the sprocket gears to facilitate passage of the coil clad high pressure hose therethrough.

11. An apparatus comprising:
    a drive mechanism;
    a hollow housing having two separable parts defining one or more parallel through passages between the parts of the housing each for receiving therethrough a coil clad portion of a fluid hose;
    a primary bull gear in the housing fastened to a drive axle connected to the drive mechanism;
    a follower bull gear rotatably fastened to a follower axle extending parallel to the drive axle; the follower bull gear meshing with the primary bull gear;
    one or more bull gear/sprocket modules in the housing fastened to each of the axles, each of the bull gear/sprocket modules having a bull gear having teeth extending to a first outer diameter and a sprocket gear having teeth extending a distance less than the first outer diameter, wherein the bull gear teeth of the one or more bull gear/sprocket modules on the drive axle mesh with corresponding bull gear teeth of the bull gear/sprocket module on the follower axle to define between adjacent bull gears an opening width for receiving and passing therebetween a coil clad portion of a high pressure hose aligned with the one or more passages through the housing, and wherein the sprocket gear teeth of the corresponding bull gear/sprocket modules are spaced apart so as to engage the coil clad portion of the high pressure hose, and wherein each tooth on each sprocket gear has a central recessed portion to accommodate passage of the high pressure hose without engaging a surface of the high pressure hose and outer portions extending radially beyond the recessed portion of each tooth so as to engage the coil clad portion of the high pressure hose.

12. The apparatus according to claim 11 wherein the central recessed portion has an arcuate shape.

13. The apparatus according to claim 11 wherein the primary bull gear is keyed to the drive axle.

14. The apparatus according to claim 11 wherein only the primary bull gear is fixed to the drive axle and each of the bull gear/sprocket modules on the drive axle are bolted to the primary bull gear.

15. The apparatus according to claim 11 wherein there are three bull gear/sprocket modules fastened to the primary bull gear and three bull gear/sprocket modules fastened to the follower bull gear.

16. The apparatus according to claim 15 wherein each tooth on each sprocket gear has a tapered portion adjacent the central recessed portion for engaging the coil clad portion of the high pressure hose.

17. The apparatus according to claim 11 wherein the coil clad hose includes a flat wire coil spring wrapped around the high pressure hose.

18. An apparatus for feeding and retracting one or more high pressure hoses, each having a flat wire spring wrapped therearound compressively engaging the high pressure hose, the apparatus comprising:
- a drive mechanism;
- a primary bull gear fastened to a drive axle connected to the drive mechanism;
- a follower bull gear rotatably fastened to a follower axle extending parallel to the drive axle; the follower bull gear meshing with the primary bull gear;
- one or more bull gear/sprocket modules fastened to each of the axles, each of the modules having a bull gear having teeth extending to a first outer diameter and a sprocket gear having teeth extending a distance less than the first outer diameter, wherein the bull gear teeth of the one or more modules on the drive axle mesh with corresponding bull gear teeth of the one or more modules on the follower axle to define between adjacent bull gears an opening width for receiving and passing therebetween a high pressure hose having the flat wire spring coil having a spaced apart pitch wrapped around the high pressure hose, wherein the sprocket gear teeth of corresponding opposing bull gear/sprocket modules are spaced apart so as to engage the flat wire spring wrapped around the high pressure hose positioned between corresponding sprockets and wherein each tooth of the sprocket gear teeth has a central recess portion to permit passage of the high pressure hose therethrough without engaging the surface of the high pressure hose and outer portions adjacent each recess portion extending radially beyond the recessed portion for engaging the coil.

19. The apparatus according to claim 18 wherein the recess portion has an arcuate shape complementary to a surface of the high pressure hose.

20. The apparatus according to claim 19 wherein each tooth adjacent the recess portion is tapered.

* * * * *